Figures 1, 2:
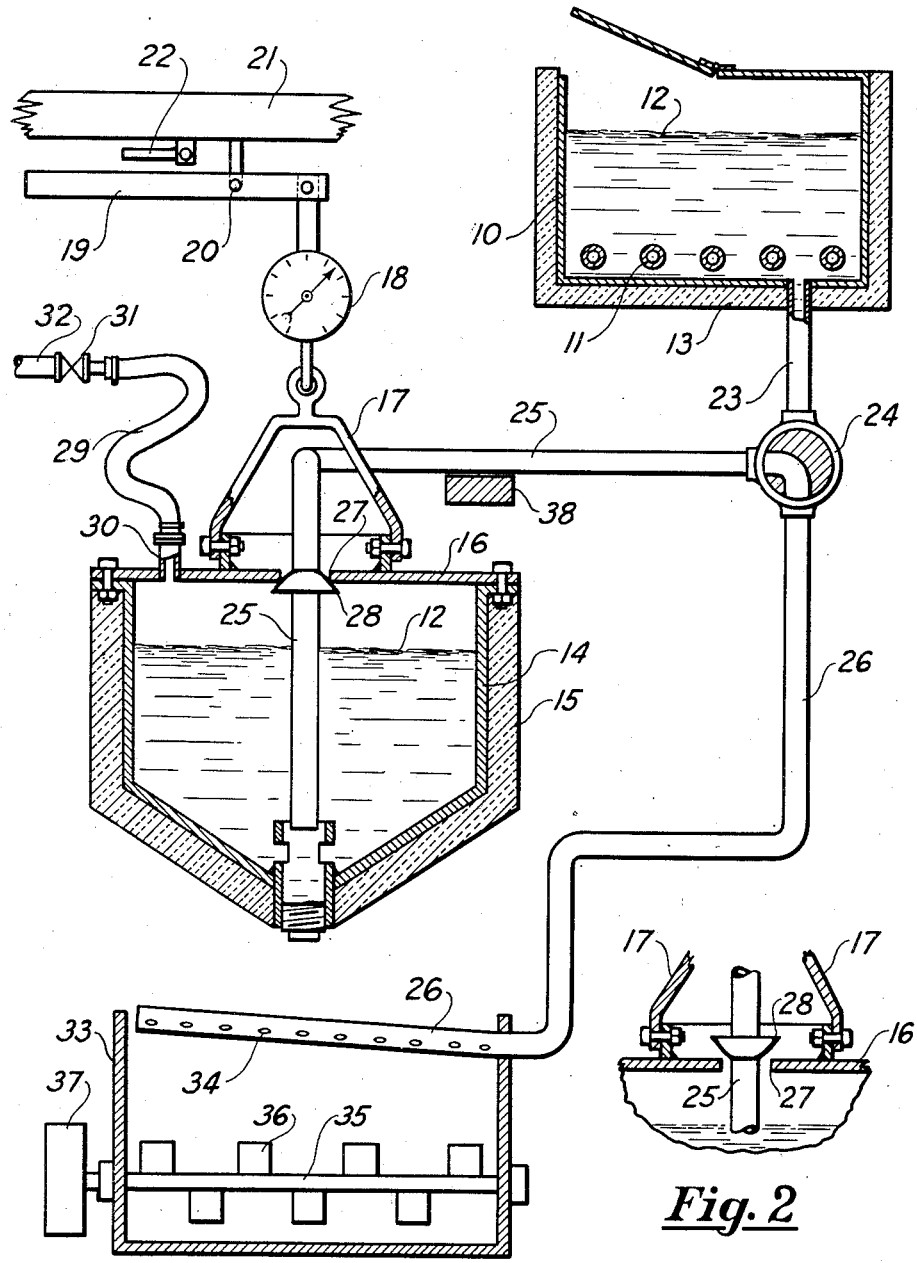

June 30, 1942.  L. BRYAN  2,287,829

LIQUID METERING DEVICE

Filed May 3, 1940

INVENTOR
LLOYD BRYAN

BY  *J. R. Adams*
ATTORNEY

Patented June 30, 1942

2,287,829

UNITED STATES PATENT OFFICE 2,287,829

LIQUID METERING DEVICE

Lloyd Bryan, Los Angeles, Calif., assignor to Standard Oil Company of California, San Francisco, Calif., a corporation of Delaware Application May 3, 1940, Serial No. 333,152

6 Claims. (Cl. 221—95)

This invention relates to apparatus for dispensing liquids. It relates particularly to apparatus for dispensing predetermined quantities of melted or liquid bituminous material for use in the manufacture of mastic compositions, such as those of the C. S. McDonald Patent No. 1,984,649 which may be applied to pipe to form a corrosion resistant coating by apparatus such as that described and claimed in my joint Patent No. 2,186,361 with William R. Postlewaite.

Heretofore melted bituminous materials have been metered by noting the depth to which a standard container is filled, the material subsequently being emptied from the container by gravity or by displacement with compressed air. In other cases the depth to which a container is filled has been measured by means of the increase in pressure caused by the introduction of the liquid material into a closed container, the pressure rise indicating the volume of air displaced, according to well-known physical laws.

This invention broadly comprehends an improved arrangement for weighing a predetermined quantity of liquid material in a standard container, closing the latter, and displacing the liquid by means of compressed air or gas, various parts of the weight tank and piping system co-operating to make those operations rapid and convenient, as will be apparent from the following description and drawing.

It is an object of this invention to provide an improved apparatus for weighing and dispensing a predetermined amount of a liquid material, for example melted asphalt or other bituminous substances.

Another object is to provide a semiautomatic means for accumulating a predetermined quantity of liquid in a container, and then displacing that liquid into a piping system with a minimum of equipment that will tend to become clogged or obstructed by the material being handled.

Another object is to provide a simple arrangement of a melting tank for asphalt or other bituminous material, a metering device for the melted material and a distributor for introducing a predetermined quantity of the melted bituminous material into a pug mill or other mixing device in which it is to be incorporated with mineral aggregate or other additive materials.

These and other objects will be more fully apparent from the following description and from the appended drawing which forms a part of this specification and illustrates a preferred arrangement of the invention.

In the drawing, Figure 1 is a vertical and part sectional view of an asphalt or other liquid metering device together with a melting tank and a pug mill into which the asphalt is to be delivered.

Figure 2 is a vertical sectional view of an alternative valve arrangement for the apparatus of Figure 1.

In the drawing, reference numeral 10 designates a tank provided with heating coils 11 through which a hot fluid, such as steam or oil, may be circulated from any suitable source to supply heat for melting the asphalt or other bituminous material 12 which is to be metered and dispensed. Desirably, tank 10 is insulated as at 13 to prevent loss of heat from the melted material.

The metering or dispensing apparatus comprises generally a tank or container 14, insulated as at 15 to prevent cooling of the melted material. A cover plate 16 is secured to the walls of tank 14 and is provided with a yoke 17 suspended from scale 18, which in turn is supported from a lever 19, pivoted at 20 to a convenient support 21. This arrangement permits metering tank 14 to be lifted by pulling downwardly on the left end of lever 19 so that the weight of tank 14, and whatever liquid 12 may be contained within the tank, will be indicated on scale 18. If desired, a latch 22 may be provided to hold the left end of the lever in its lowest position for a purpose which will be further apparent below.

The piping which connects tank 10 with metering tank 14 is illustrated as comprising an outlet pipe 23 which is selectively connected by means of a three-way cock 24 to an asphalt inlet pipe 25 and an asphalt discharge pipe 26. Inlet pipe 25 is stationary and may be supported by suitable means as indicated at 38. Pipe 25 extends beneath yoke 17 and thence downwardly into metering tank 14 through an opening 27 in the cover plate 16 of that tank. An enlargement such as valve member 28 on the downwardly extending portion of pipe 25 serves to close opening 27 when metering tank 14 is lowered. This action not only seals the opening 27 but releases at least part of the weight of the metering tank 14 and its contents from scale 18 and lever 19.

In order to displace the melted asphalt or other material 12 from metering tank 14, a flexible means such as hose 29 is connected to a pipe nipple 30 in the cover plate 16 of metering tank 14 and is supplied with a pressure fluid such as compressed air through control valve 31 from pipe 32, the latter leading to any suitable source of air or gas under pressure.

Asphalt discharge pipe 26 leads from three-way cock 24 to whatever apparatus is designed to receive the melted material, such as pug mill 33, pipe 26 desirably being inclined upwardly as shown, extending throughout the length of mill 33, and provided along its lower surface with spaced apertures 34 so that the asphalt charge will be sprayed or distributed uniformly into mill 33. Inclining pipe 26 assists in its complete emptying, as any residual liquid runs downwardly against the air flow and is blown out through apertures 34. Pug mill 33 may be of any desired type, in this example having one or more shafts 35 with paddles 36 adapted to be rotated by means, such as a pulley 37, driven from any suitable source of power.

In operation, lever 19 is pulled downwardly so that metering tank 14 is suspended from support 21 and is free from contact with valve 28. Three-way cock 24 is turned so that asphalt will flow from melting tank 10 through pipes 23 and 25 into metering tank 14, where its weight will be indicated by scale 18. As soon as the predetermined quantity of material is received in tank 12, as indicated by scale 18, three-way cock 24 is turned to shut off the flow of melted material into metering tank 14. Lever 19 is then released to lower metering tank 14 so that the aperture 27 in cover plate 16 will be closed by valve 28. Three-way cock 24 is then turned to the position indicated, placing pipes 25 and 26 in communication, and valve 31 is opened to permit air to enter metering tank 14 above the liquid level therein to displace the liquid upwardly through pipe 25, from which it will flow into pipe 26 and thence to pug mill 33. As soon as metering tank 14 and pipe 26 are empty, as will be evidenced by the escape of air through apertures 34 in pipe 26, the air control valve 31 is closed. Lever 19 is then moved downwardly to lift metering tank 14 from contact with valve 28, thus releasing any residual air pressure in that tank, after which the cycle just outlined may be repeated.

If desired, enlargement 28 could be outside of or above the cover plate 16 of tank 14, as in Figure 2, and, after the desired weight of liquid material such as asphalt was placed in that tank, it could be raised to contact the lower face of enlargement 28, to seal off the aperture 27 during the time air was being admitted to displace the liquid through pipes 25 and 26.

Although a single form of this equipment and one mode of its operation have been illustrated, it is obvious that numerous changes could be made without departing from the invention, which appears to lie in the provision of a vertically movable weighing tank adapted to cooperate with a valve or other enlargement associated with means such as a stationary conduit extending downwardly into the tank through an opening in its cover, these acting to permit the liquid in the tank to be successively weighed and then discharged or displaced by means of air or other pressure fluid introduced into the tank above the level of the liquid therein. It is obvious that many other modifications of this arrangement could be made, and all those that are within the scope of the appended claims are embraced thereby.

I claim:

1. Apparatus for dispensing predetermined quantities of a liquid, such as melted bituminous material or the like, comprising a movable tank for said liquid, said tank having a closed bottom, means for weighing said tank and its liquid contents, a conduit independent of said tank and extending into the lower portion of said tank, valve means responsive to movement of said tank to close the top thereof at a predetermined point in its travel, and means for admitting a pressure fluid above the liquid in said tank to displace said liquid outwardly through said conduit when said tank is closed.

2. An apparatus for dispensing predetermined quantities of a liquid, such as melted bituminous material or the like, comprising a movable tank for said liquid, means for weighing said tank and its liquid contents, a stationary conduit extending into the lower portion of said tank, a valve member carried by said conduit and a seat therefor carried by a wall of said tank to close the top thereof at a predetermined point in the travel of said tank, and means for admitting a pressure fluid above the liquid in said tank to displace said liquid outwardly through said conduit when said tank is closed.

3. An apparatus for dispensing predetermined quantities of a liquid, such as melted bituminous material or the like, comprising a movable tank for said liquid, means for weighing said tank and its liquid contents, said tank being provided with an apertured top, a stationary conduit extending through said aperture into the lower portion of said tank, a valve member carried by said conduit and adapted to close said aperture when said tank is at a predetermined point in its travel, and means for admitting a pressure fluid above the liquid in said tank to displace said liquid outwardly through said conduit when said tank is closed.

4. Apparatus for dispensing predetermined quantities of a liquid, such as melted bituminous material or the like, comprising a tank having a cover, vertically movable support means for said tank, a weight-responsive scale connecting said tank with said support means, a stationary conduit communicating with the lower portion of said tank and extending upwardly through an opening in the cover of said tank, a valve member on said conduit adapted to close said opening when said tank is moved to a predetermined position, and means for admitting a gas under pressure to said tank to displace liquid outwardly through said conduit when said valve is seated in said opening.

5. Apparatus according to claim 4 in which said valve means is effective to close said opening when said tank is lowered to a predetermined position.

6. Apparatus according to claim 4 in which said valve means is effective to close said opening when said tank is raised to a predetermined position.

LLOYD BRYAN.